US009473636B2

(12) United States Patent
Lenzeder

(10) Patent No.: US 9,473,636 B2
(45) Date of Patent: Oct. 18, 2016

(54) METHOD FOR OPTIMIZING CUSTOMER SUPPORT IN THE ACTIVATION OF ACCESS CONTROL DEVICES OR PAYMENT DEVICES

(71) Applicant: SKIDATA AG, Groedig/Salzburg (AT)

(72) Inventor: Harald Lenzeder, Lenzing (AT)

(73) Assignee: SKIDATA AG, Groedig/Salzburg (AT)

( * ) Notice: Subject to any disclaimer, the term of this patent is extended or adjusted under 35 U.S.C. 154(b) by 0 days.

(21) Appl. No.: 14/951,619

(22) Filed: Nov. 25, 2015

(65) Prior Publication Data
US 2016/0156780 A1    Jun. 2, 2016

(30) Foreign Application Priority Data
Nov. 28, 2014   (DE) .......................  10 2014 117 508

(51) Int. Cl.
| H04M 1/00 | (2006.01) |
| H04M 1/60 | (2006.01) |
| H04M 3/51 | (2006.01) |
| G07F 19/00 | (2006.01) |
| G06Q 20/40 | (2012.01) |
| G07C 9/00 | (2006.01) |
| H04M 15/00 | (2006.01) |
| H04N 7/14 | (2006.01) |

(52) U.S. Cl.
CPC ..... *H04M 3/5183* (2013.01); *G06Q 20/40145* (2013.01); *G07C 9/00* (2013.01); *G07F 19/20* (2013.01); *H04M 15/68* (2013.01); *H04N 7/141* (2013.01); *G07C 2209/08* (2013.01)

(58) Field of Classification Search
CPC .... G07B 15/06; G07B 15/063; G07C 9/025; G08B 13/19658; G08B 25/08; G08B 25/008; G08B 25/016; H04N 7/186
USPC ............... 379/93.17, 93.21, 93.23, 100.05, 379/100.06, 100.09, 100.14, 102.01, 379/102.02, 102.07, 167.01, 167.03, 379/167.04, 167.05, 167.07, 167.12, 167.14
See application file for complete search history.

(56) References Cited

U.S. PATENT DOCUMENTS

| 5,644,630 | A  * | 7/1997  | Durco, Jr. .............. H04M 9/00 379/159 |
| 6,505,774 | B1 * | 1/2003  | Fulcher ............. G06Q 30/0284 235/379 |
| 7,339,495 | B2 * | 3/2008  | Kavner .................. G07B 15/06 340/903 |
| 8,294,574 | B2 * | 10/2012 | Haywood ........ G08B 13/19658 340/540 |
| 2004/0226993 | A1 * | 11/2004 | Fulcher ............. G06Q 30/0284 235/381 |
| 2008/0308322 | A1 * | 12/2008 | Augustyniak ........... E05G 5/003 177/1 |
| 2009/0072988 | A1 * | 3/2009  | Haywood ........ G08B 13/19658 340/686.6 |
| 2009/0315229 | A1 * | 12/2009 | Tomasic .................... C21B 7/24 266/44 |

FOREIGN PATENT DOCUMENTS

| DE | 29801306 U1 | 1/1998 |
| DE | 202006001503 U1 | 4/2006 |
| DE | 102005058620 A1 | 6/2007 |
| DE | 202013010551 U1 | 2/2014 |

OTHER PUBLICATIONS

Search Report of Corresponding German Application No. DE 10 2014 117 508.5.

* cited by examiner

*Primary Examiner* — Binh Tieu
(74) *Attorney, Agent, or Firm* — Karl F. Milde, Jr.; Eckert Seamans Cherin & Mellott, LLC

(57) ABSTRACT

A method for optimizing customer support during the activation of an access control device or payment device of an access control system includes starting a pre-set timer when the access control or payment device is activated, and automatically establishing a communication between the customer and the staff support personnel over an intercom system or a video intercom system and activating a video connection whenever the pre-set timer expires and (1) the customer is still standing in front of the access control or payment device, (2) the customer's vehicle is still located in front of the access control or payment device, (3) the customer is still operating the device before completion of the transaction or interaction that was initiated when the timer was started, or (4) an n-times repetition of operator errors occurs in the operation of the access control or payment device where n is a pre-specified natural number ≥2. The video connection and a display device indicates to the staff personnel whether and how the customer is operating the access control device or payment device.

6 Claims, No Drawings

METHOD FOR OPTIMIZING CUSTOMER SUPPORT IN THE ACTIVATION OF ACCESS CONTROL DEVICES OR PAYMENT DEVICES

BACKGROUND OF THE INVENTION

The present invention relates to a method for optimizing the customer support provided during the activation of access control devices or payment devices of an access control system.

From the prior art, for the purpose of so-called "remote support," it is known to offer a customer the facility to communicate with qualified staff over an intercom system (access phone) if problems occur during the operation of an access control device or payment device of an access control system, due, for example, to operator errors or invalid or illegible customer media or tickets. In this case the customer must actively request customer support, for example by activating an appropriate switch or pressing an appropriate button.

The customer normally has to tell the customer support staff what he is doing at the time, what difficulties or problems occurred when operating an access control device or payment device and, where appropriate, what he can see on a display screen of the access control device or payment device. However, this means that solving the customer's problem takes a long time, since firstly, accurate information is required from the customer and secondly, the staff cannot immediately see the nature of the problem and what caused it.

SUMMARY OF THE INVENTION

A principal object of the present invention is to specify a method for optimizing customer support during the operation of access control devices or payment devices of an access control system, the implementation of which enables a customer to be assisted quickly and efficiently. This is of particular importance since, when such access control or payment devices are used queues, can quickly form, resulting in an adverse effect on their normal operation.

The aforementioned object, as well as other objects which will become apparent from the discussion that follows, are achieved, according to the present invention, by providing a method for optimizing customer support during the activation of access control devices or payment devices of an access control system in which, when an access control device or payment device is activated, a pre-set timer is started. Thereafter, if the pre-set timer expires and a customer is still standing in front of the access control or payment device or is located in a vehicle which is still in front of the access control or payment device, or the customer is still operating the device on the expiry of the timer and has not completed the transaction and/or interaction (hereafter termed the procedure) which was started between the customer and the access control device or payment device when the timer was started, a communication is automatically established between the customer and the support staff over an audio intercom system or a video intercom system, and a video connection is activated which indicates to the staff via a video camera and a display device whether and how the customer is operating the access control device or payment device.

These measures enable the customer to be informed over the intercom system or a video-intercom system how the access control or payment device should be operated in order to complete the desired procedure. The video connection is used to check whether the customer is following the instructions and/or whether he is operating the access control or payment device correctly. It is also possible to detect whether or not an operator error has occurred, or an invalid or illegible customer medium or ticket is being used. The communication via the video intercom system may be bi-directional with respect to the image transmission.

DESCRIPTION OF THE PREFERRED EMBODIMENTS

The presence of a customer in front of an access control or payment device is detected by at least one suitable sensor; for example, by a light barrier, a thermal camera, a radar sensor or a weighing sensor. The at least one sensor can also be used to detect the presence of a vehicle in which a customer is located. In this case at least one induction loop or at least one radar sensor is preferably used for the purpose of vehicle identification.

In an advantageous extension of the method according to the invention, in addition to activating the intercom system or the video intercom system and the video link on the expiry of the timer as a customer support measure, it is proposed to carry out a remote control of the access control or payment device to complete the procedure requested by the customer.

This enables the desired procedure to be visibly completed for the customer, allowing the customer to learn the operation of the device. For this purpose, the access control or payment device is connected to a computer over which the remote control is carried out, for the purpose of data communication.

The initiation of the customer support measures is controlled by a controller that is connected to the access control or payment device and to the at least one sensor for detecting the presence of a customer or a vehicle at an access control or payment device, for the purpose of data communication. When the pre-set timer has expired, the access control or payment device sends a corresponding signal to the controller.

As part of an extension of the invention, by means of suitable cameras and suitable evaluation electronics a face detection process is carried out, in order to ensure that the customer who initiated a transaction or interaction at the beginning of the launch of the timer is also the person who is standing at the access control or payment device or is located in a vehicle in front of the access control or payment device after the expiry of the pre-set timer. The evaluation electronics is connected to the controller which initiates the customer support measures if the persons are identical.

In addition to, or as an alternative to the criterion of the expiry of a pre-set timer, the n-times repetition of operator errors in the operation of the access control or payment device, where n is a pre-specified natural number ≥2, can be used as a criterion for beginning the initiation of the customer support measures. If this criterion is satisfied, the access control or payment device sends a corresponding signal to the controller, which then initiates the customer support measures.

There has thus been shown and described a novel method for optimizing the customer support provided during the activation of access control devices or payment devices of an access control system which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A method for optimizing customer support during a customer activation of an access control device or a payment device of an access control system, said method comprising the steps of:
    (a) starting a pre-set timer when said access control device or payment device is activated by a customer;
    (b) if the pre-set time of the timer expires when the customer is still standing in front of said access control device or payment device, or a vehicle of the customer is still positioned in front of the device, or the customer is still in a process of operating the device prior to completion of a transaction or interaction between the customer and the device that was initiated when the timer was started, automatically establishing a communication link between the customer and staff support personnel over an audio intercom or a video intercom;
    (c) activating a video connection that indicates to the support personnel via a video camera and a display device whether and how the customer is operating the device; and
    (d) automatically establishing the communication and activating the video connection if an n-times repetition of operator errors occurs in the operation of the access control or payment device, where n is a pre-specified natural number $\geq 2$.

2. The method for optimizing customer support during a customer activation of an access control device or a payment device of an access control system according to claim 1, wherein the presence of the customer in front of the access control or payment device is detected by at least one sensor.

3. The method for optimizing customer support during a customer activation of an access control device or a payment device of an access control system according to claim 2, wherein said sensor is selected from the group consisting of a light barrier, a thermal camera, a radar sensor and a weight sensor.

4. The method for optimizing customer support during a customer activation of an access control device or a payment device of an access control system according to claim 2, wherein said sensor is an induction loop for vehicle identification.

5. The method for optimizing customer support during a customer activation of an access control device or a payment device of an access control system according to claim 1, further comprising, as a customer support measure, remotely controlling of the access control or payment device to complete the procedure requested by the customer, in a manner which enables the requested operation to be visibly completed for the customer upon expiry of the timer.

6. A method for optimizing customer support during a customer activation of an access control device or a payment device of an access control system said method co sin the steps of:
    (a) starting a pre-set timer when said access control device or payment device is activated by a customer;
    (b) if the pre-set time of the timer expires when the customer is still standing in front of said access control device or payment device, or a vehicle of the customer is still ositioned in front of the device, or the customer is still in a process of operating the device prior to completion of a transaction or interaction between the customer and the device that was initiated when the timer was started, automatically establishing a communication link between the customer and staff support personal over an audio intercom or a video intercom;
    (c) activating a video connection that indicates to the support personnel via a video camera and a d device whether and how the customer is operating the device; and
    (d) conducting automatic face recognition, by means of at least one camera and evaluation electronics, in order to ensure that the customer who initiated a transaction or interaction at the beginning of the start of the pre-set timer is also the person who is standing at the access control or payment device or is located in a vehicle in front of the access control or payment device after the expiry of the timer.

* * * * *